United States Patent
Marimon et al.

(10) Patent No.: US 7,448,572 B2
(45) Date of Patent: Nov. 11, 2008

(54) DIRECT MOUNTED PROPULSION FOR NON-RIGID AIRSHIPS

(75) Inventors: Thomas L. Marimon, Silver Lake, OH (US); Jonathan Peritt, Clinton, OH (US); James E. Houmard, Akron, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/244,383

(22) Filed: Oct. 5, 2005

(65) Prior Publication Data

US 2007/0075184 A1 Apr. 5, 2007

(51) Int. Cl.
*B64B 1/24* (2006.01)

(52) U.S. Cl. .......................... 244/30; 244/24; 244/127; 244/55

(58) Field of Classification Search .............. 244/24, 244/25, 30, 31, 127, 125, 55, 54
See application file for complete search history.

(56) References Cited

U.S. PATENT DOCUMENTS

| | | | | |
|---|---|---|---|---|
| 607,240 | A * | 7/1898 | Hite et al. | 244/52 |
| 1,599,496 | A * | 9/1926 | Sheppard | 244/52 |
| 1,620,449 | A * | 3/1927 | Durr | 244/55 |
| 1,762,845 | A * | 6/1930 | Upson | 244/125 |
| 1,763,585 | A * | 6/1930 | Helma et al. | 244/125 |
| 1,800,174 | A * | 4/1931 | Bauch et al. | 244/127 |
| 1,809,220 | A * | 6/1931 | Schuette | 244/55 |
| 3,993,269 | A | 11/1976 | Crosby, Jr. | 244/33 |
| 4,085,912 | A * | 4/1978 | Slater | 244/25 |
| 5,082,205 | A * | 1/1992 | Caufman | 244/25 |
| 5,294,076 | A * | 3/1994 | Colting | 244/96 |
| 5,449,129 | A * | 9/1995 | Carlile et al. | 244/26 |
| 6,142,414 | A * | 11/2000 | Doolittle | 244/25 |
| 6,315,242 | B1 * | 11/2001 | Eichstedt et al. | 244/30 |
| 6,427,943 | B2 * | 8/2002 | Yokomaku et al. | 244/30 |
| 6,540,178 | B1 * | 4/2003 | Hillsdon | 244/30 |
| 7,055,777 | B2 * | 6/2006 | Colting | 244/30 |
| 2003/0234320 | A1 | 12/2003 | Colting | 244/96 |

FOREIGN PATENT DOCUMENTS

WO       WO 92/06002       4/1992

* cited by examiner

*Primary Examiner*—Bret Hayes
*Assistant Examiner*—Benjamin P Lee
(74) *Attorney, Agent, or Firm*—Renner Kenner Greive Bobak Taylor & Weber

(57) ABSTRACT

A propulsion assembly for attachment to the enclosing material of an airship which includes a base which is positioned proximate to the enclosing material. An extension member having opposed ends projects away from the base and includes opposed ends. A motor assembly is attached to the end of the extension member opposed to the base. A mounting assembly is attached to the enclosing material and a plurality of pre-tensioned guy cables connect the mounting assembly to the extension member.

20 Claims, 5 Drawing Sheets

DIRECT MOUNTED PROPULSION FOR NON-RIGID AIRSHIPS

TECHNICAL FIELD

The present invention is related to a propulsion system for high-altitude pressurized airships. More specifically, the present invention is related to a propulsion system, which is directly mounted to a non-rigid skin of high-altitude airships. More particularly, the present invention is related to a propulsion system for pressurized airships, which attaches directly to a fabric skin and efficiently distributes applied loads to the skin.

BACKGROUND ART

Generally, lighter-than-air vehicles, hereinafter airships, are powered by externally mounted propulsion systems. These propulsion systems typically take the form of a plurality of independent gas or electric powered propeller modules. These propeller modules are sometimes movable in multiple axes in order to direct the flow of air and thereby steer the airship.

Prior art airships further include a gondola mounted at the bottom of the airship, which provides a passenger compartment, storage areas and the like. Airships of this nature are typically employed for a variety of purposes including advertising and transportation. Because the gondola is essentially a rigid body and includes a rigid outer frame, they provided the most suitable location to mount the propeller modules.

Recently, the need has become apparent for airships that travel to greater heights than traditional airships. Such high altitude airships serve a multitude of functions including, but not limited to, communications, weather tracking and intelligence gathering. Particular concerns arose in development of such vehicles, including the need for extended flight durations over an area of interest. Extended flight times are accomplished by controlling high altitude airships autonomously or from an external location, thereby eliminating the need for human presence on the airship. Because human operators are no longer required on the airship, the traditional gondola became unnecessary. Further, traditional gondolas are relatively heavy, and conflict with the need to make the airship extremely light. For these reasons, the traditional gondola was replaced by a much smaller bay or external mounting surface, which holds the computer airship controls, communication equipment and mission specific equipment such as cameras, sensors and the like.

Propulsion in high altitude airships is accomplished using electrically powered motors coupled to external propellers. With the removal of the gondola from the airship, the traditional mounting point for propulsion modules was likewise removed, leaving no rigid structure on which to attach the propulsion system. Hence, the need became apparent to mount the propeller modules directly to the fabric skin of the airship. High altitude airships employ a flexible outer fabric skin or membrane for hull construction. A membrane has very little rigidity normal to its surface. This compliance makes it difficult to attach propeller modules with the stiffness that they need to react against the various loads such as thrust, weight, and torque. Furthermore, the fabric skin is a difficult surface to mount articles particularly because internal pressures within the airship change with ascent and descent. As the internal pressures change, the exterior fabric skin rigidity changes.

Therefore, there exists a need in the art to effectively attach external articles, and particularly external propulsion systems that impart significant loads such as thrust, weight, and torque, to the fabric skin exterior of high altitude airships.

DISCLOSURE OF THE INVENTION

In light of the foregoing, it is a first aspect of the present invention to provide a mounting approach for a propulsion system for a non-rigid airship.

It is another aspect of the present invention to provide an assembly for attachment to the enclosing material of a non-rigid airship comprising a base positioned proximate to the enclosing material, an extension member having opposed ends projecting from the base away from the enclosing material, a motor assembly attached to the end of the extension member opposed to the base, a mounting assembly attached to the enclosing material, a plurality of guy cables, each having a first and second end wherein the first end of the guy cable couples to the mounting assembly and the second end of the guy cable couples to the extension member, whereby the cables are under tension and a portion of the extension member is under compression.

Yet another aspect of the present invention is to provide an assembly for attachment to a flexible membrane comprising a base positioned proximate to the membrane, an extension member having opposed ends projecting from the base, a motor assembly attached to the end of the extension member opposed to the base, a pair of mounting assemblies separate from the base, attached to the flexible membrane and positioned on opposed sides of the base, at least two guy cables, each having a first and second end, wherein the first end of each guy cable is coupled to one of the mounting assemblies and the second end of each cable is coupled to the extension member.

Still a further aspect of the present invention is to provide an airship with a gas filled flexible outer membrane, the airship including at least one motor coupled to a propeller, an extension member projecting away from the membrane, the extension member having a first end positioned proximate to the membrane and a second end attached to the motor, at least two mounting assemblies attached to the outer membrane and spaced from the extension member, wherein at least a portion of the extension member is compressed into the membrane by the mounting assemblies.

BRIEF DESCRIPTION OF THE DRAWINGS

For a complete understanding of the objects, techniques and structure of the invention, reference should be made to the following detailed description and accompanying drawings, wherein.

DETAILED DESCRIPTION OF THE INVENTION

Figure 1:
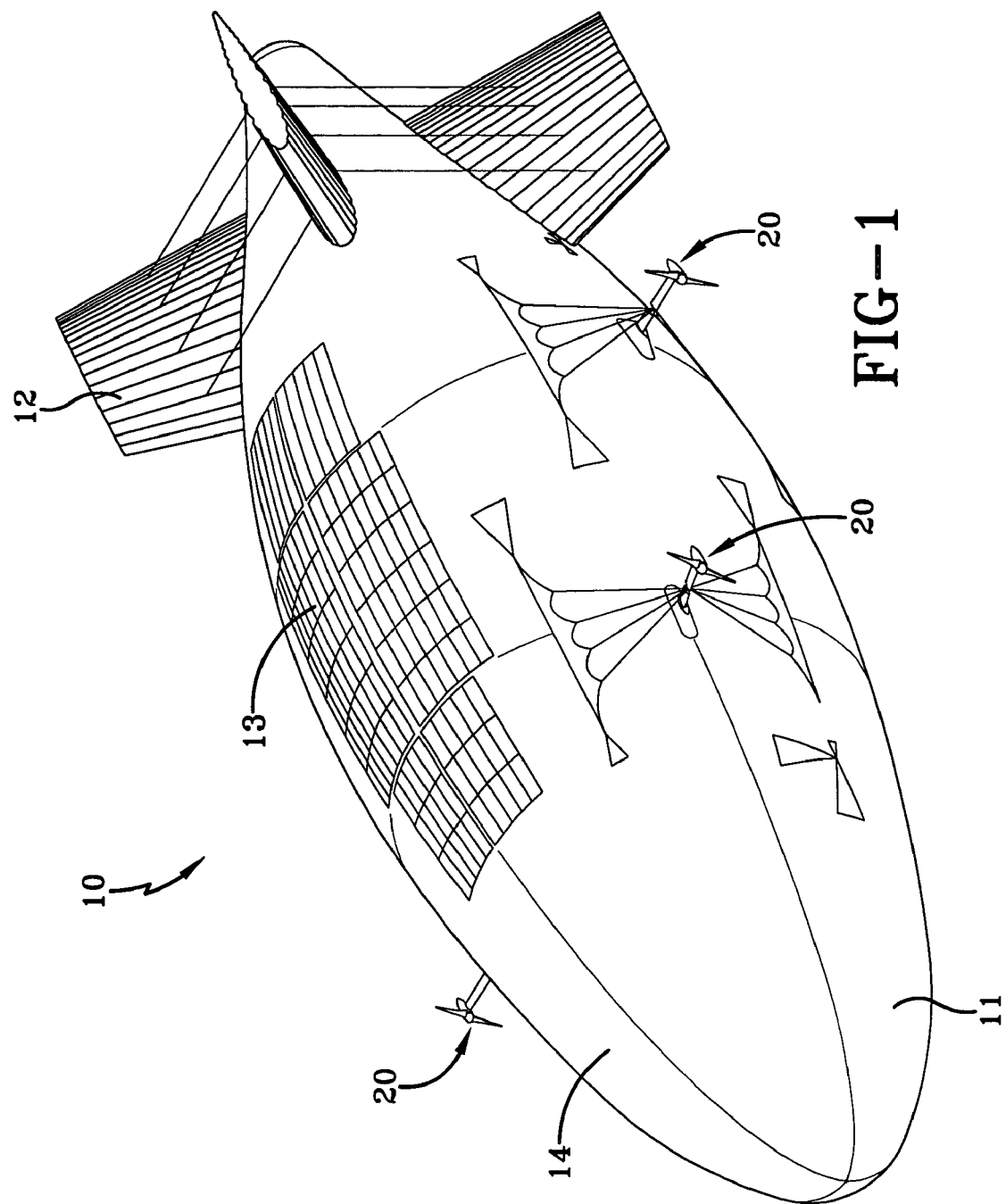
FIG. 1 is an elevated perspective view of the airship of the present invention.

Referring now to the drawings and in particular to FIG. 1 it can be seen that an airship according to the present invention is designated generally by the numeral 10. The vehicle 10 includes a hull 11 and may include one or a plurality of stabilizing fins 12. Although an oblong shape is shown for the hull 11, it will be appreciated that any shape, including a sphere, ellipse, parabola or tear-drop, could be used. The vehicle 10 may carry a payload (not shown), which can include surveillance devices, weather monitoring equipment, communications equipment and the like. The size of the payload may vary in accordance with the size of the vehicle. The payload may be carried externally, internally or incorporated into the hull material such as for radar transmit/receive applications. Vehicle 10 may also include solar panels 13 on the upper or any appropriate surface thereof. Solar panels 13 convert sunlight to electrical energy which may be used to power various onboard systems such as propulsion, communications and mission specific equipment.

The vehicle 10 is constructed with an exterior enclosing material 14, which maintains a gas under pressure therein. In general, the enclosing material 14 exhibits high strength, light weight and the ability to withstand extreme temperature and pressure variations. An exemplary material is disclosed in U.S. patent application Ser. No. 10/388,772, filed Mar. 14, 2003, and incorporated herein by reference. While in use, the vehicle is exposed to a wide range of external pressures and temperatures as it ascends and descends to various operating altitudes. During such altitude changes the gas within the enclosing material expands and contracts because of the pressure and temperature variations. As the gas within the vehicle 10 expands, the enclosing material 14 experiences varied pressure thereon.

Figure 2:
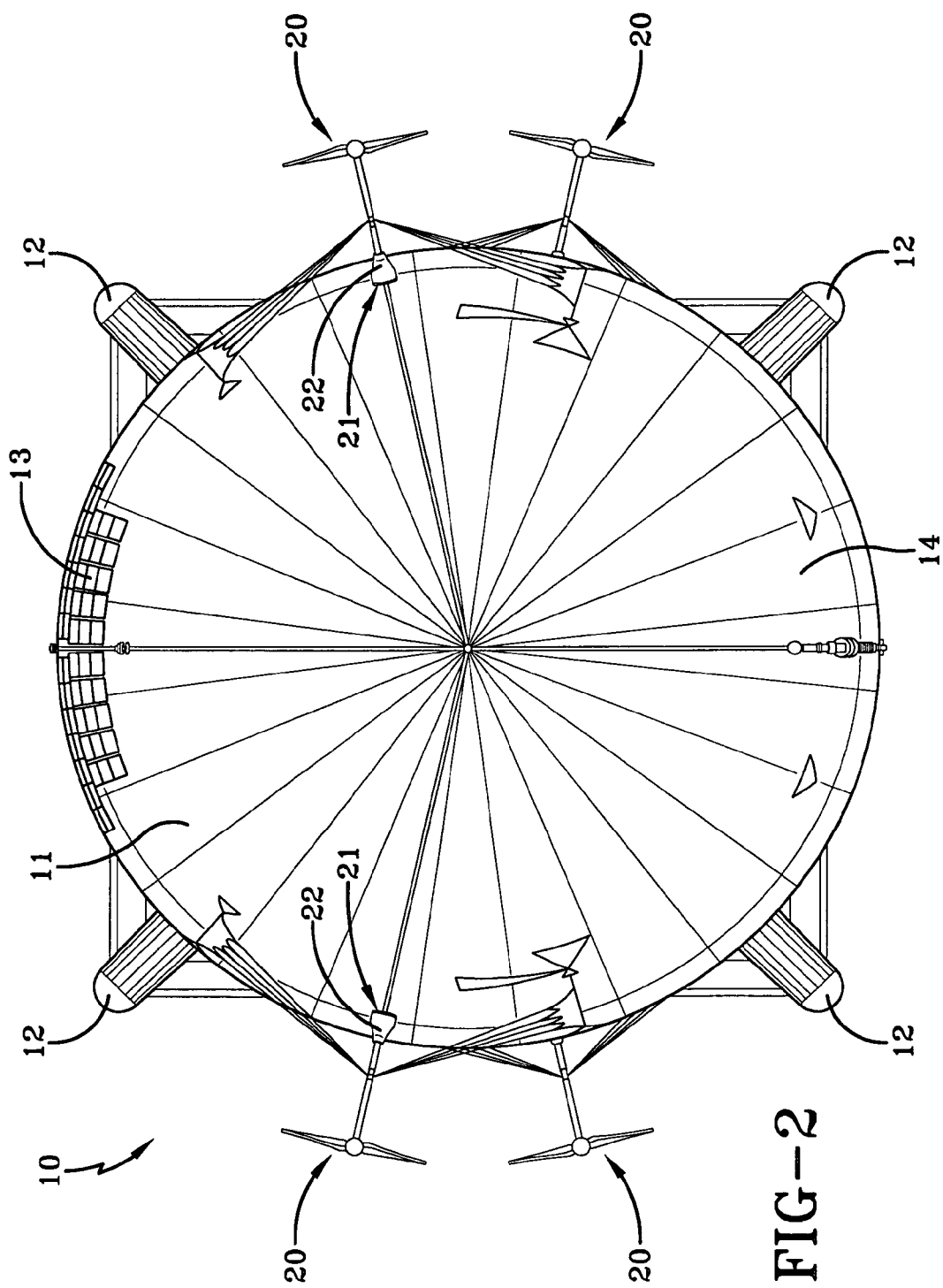
FIG. 2 is a front profile view of the airship of FIG. 1.
Figure 3:
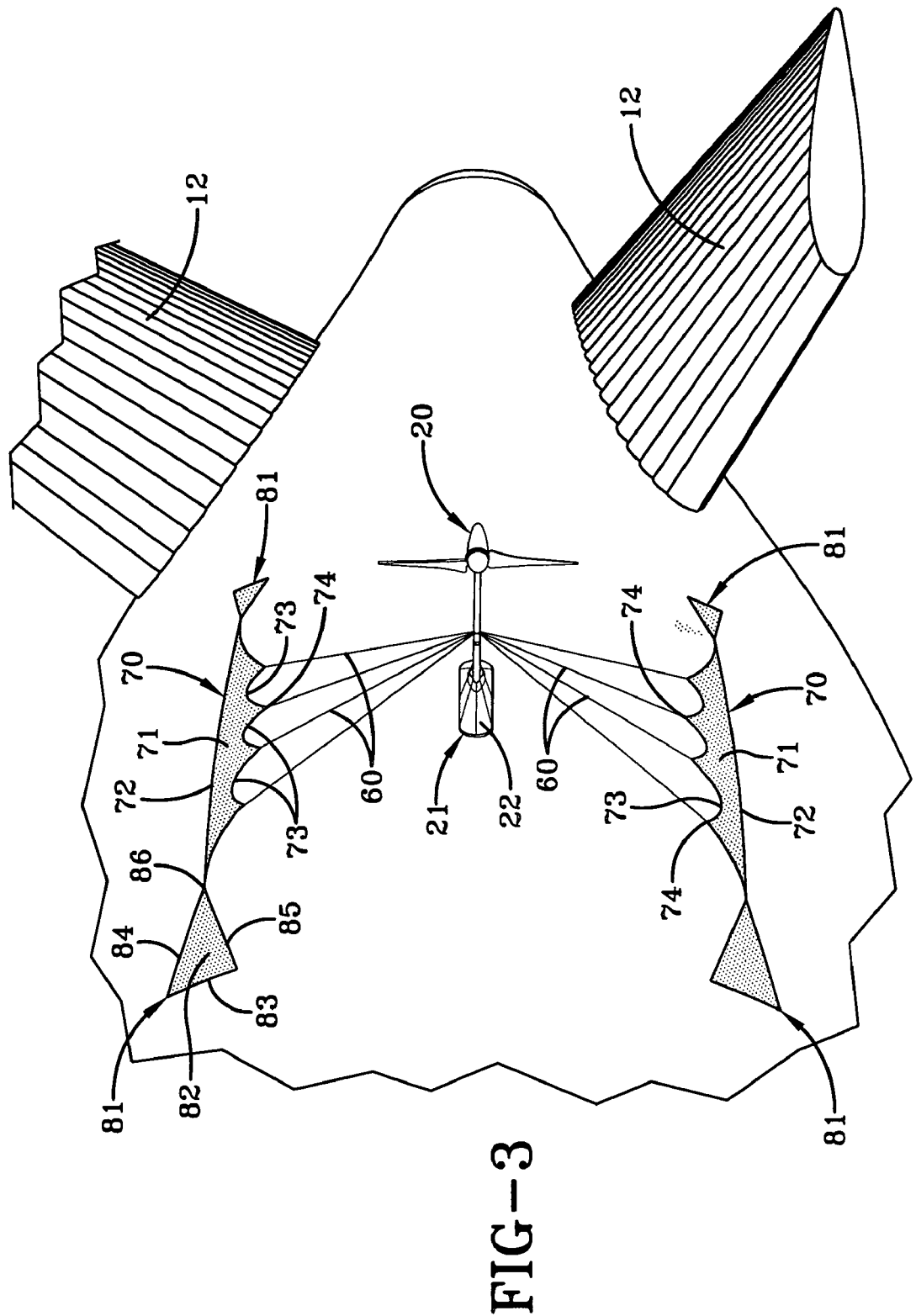
FIG. 3 is a partial elevated perspective view of the propulsion assembly of the present invention.
Figure 4:
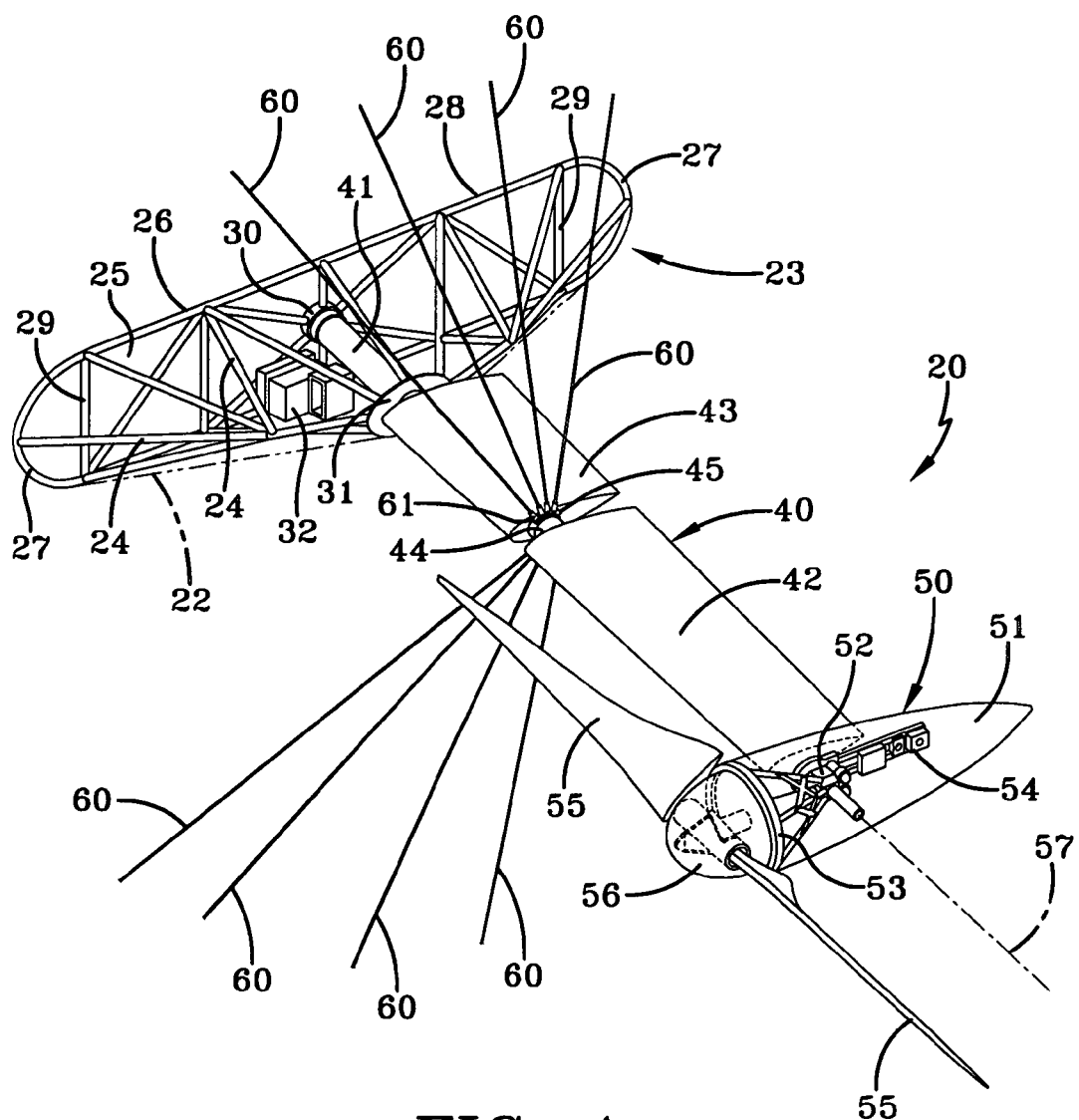
FIG. 4 is a elevated perspective view of the propulsion assembly of FIG. 3.

A propulsion assembly 20 is provided which attaches to the non-rigid enclosing material 14 as will hereinafter be discussed. As best seen in FIGS. 2-4, the propulsion assembly 20 includes a base 21 which is positioned proximate to enclosing material 14. Base 21 includes a housing 22 (shown in FIGS. 2 and 3, but not FIG. 4) which encloses an interior framework 23. Framework 23 is formed of a plurality of support members 24 which may be welded or mechanically interlinked. Support members 24 may be made of a light weight tubular material including but not limited to light weight metals or plastic materials. Support members 24 define a bottom surface 25 which contacts enclosing material 14. In the present embodiment, bottom surface 25 is planar, but it should be appreciated that bottom surface 25 may be provided with a slight curvature which may, or may not, substantially match the radius of curvature of the enclosing material 14 at the location of mounting. Bottom surface 25 includes a rectangular center portion 26 and semi-circular end portions 27 at the opposed ends thereof. Rectangular portion 26 includes opposed longitudinal sides 28 having lengths that are relatively larger than opposed lateral sides 29. Semi-circular end portions 27 are provided in order eliminate angled corners from contacting the enclosing material 14 because, under load, such angled corners may cause high point stresses which can cause tears in the enclosing material 14. Base 21 further includes a bottom support ring 30 positioned approximately in the center of bottom surface 25. A top support ring 31 is provided on the top of base 21 and is axially aligned with bottom support ring 30. Both support rings 30 and 31 are connected to support members 24 that are part of the framework 23. Support rings 30 and 31 are also adapted to receive a shaft 41 which will be discussed later. Electronic equipment 32 may also be provided inside housing 22 and ideally within framework 23 which optionally controls the propulsion mechanism, solar panels and/or power system usage.

Propulsion assembly 20 further includes an extension member 40 which projects out of base 21 and away from the enclosing material 14. Extension member 40 includes central shaft 41, which may be hollow to provide a pathway for electrical cables and the like. Support rings 30 and 31 of base 21 receive shaft 41 therein, thereby securing or otherwise coupling shaft 41 to base 21. Extension member 40 may be provided with spaced apart upper and lower wing portions 42 and 43 which are fixedly attached to shaft 41. Wing portions 42 and 43 are provided to promote reduced wind drag on extension member 40. The present embodiment discloses wing portions 42 and 43 which are airfoil shaped, but it should be appreciated that other aerodynamic shapes may be employed which reduce wind resistance. Inner wing portion 43 is positioned on shaft 41 proximate to base 21 and outer wing portion 42 is positioned on shaft 41 in an outwardly spaced manner which creates an exposed portion 44. Exposed portion 44 is provided with a plurality of diametrically opposed circumferentially spaced couplers 45 in the form of i-bolts, apertures, d-rings or any other means for securing high tension linkages as will be later discussed. In the present embodiment, a total of eight couplers 45 are provided although it should be appreciated that any number greater than or equal to two may be used. The couplers 45 are positioned so that each faces generally in the direction of longitudinal sides 28, with a matching diametrically opposed coupler on the opposed side of shaft 41. As will become apparent, the positioning of couplers 45 is limited by the size and placement of the propeller blade. It is desirous to place the couplers 45 as far from base 21 as possible while not interfering with the propeller blade movement.

Propulsion assembly is further provided with a motor assembly 50 positioned at the end of extension member 40 which is opposed to the base 21. Motor assembly 50 includes a housing 51 which may be oblong shaped to reduce air resistance. Housing 51 encloses a plurality of support members 52 which provide structural support for a motor 53. Housing 51 may further enclose a motor controller 54 which may optionally control motor 53. Motor 53 may be an electric motor, with electric power supplied by batteries, solar panels 13, or other means. Motor 53 is coupled to a propeller 55 and nose cone 56, the rotation thereof provides propulsion for vehicle 10. Motor assembly 50 is coupled to extension member 40 in such a manner as to allow rotation about an axis 57 defined by shaft 41.

Propulsion assembly 20 further includes a plurality of guy cables 60 having opposed ends 61 and 62. Each end 61 of guy cable 60 is attached to one of the plurality of couplers 45. Guy cables 60 are composed of low weight, high strength materials capable of withstanding tensile loading. In one or more embodiments guy cables 60 are composed of a synthetic material. Guy cables 60 extend away from extension member 40 towards the hull 11. End 62 of cables 60 are attached to a mounting assembly 70 as will be hereinafter discussed.

Figure 5:
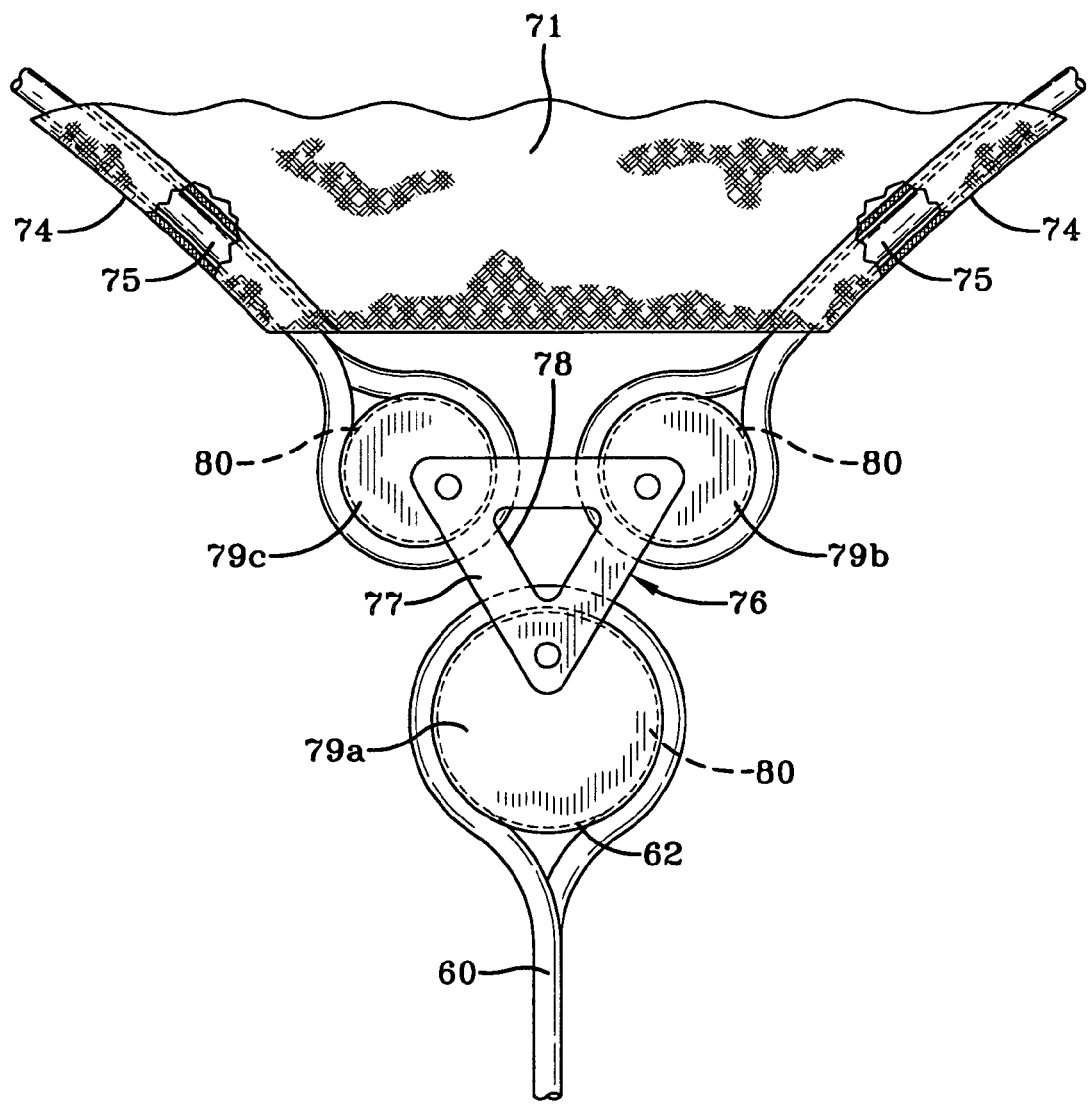
FIG. 5 is a top view of a bracket of the present invention.

A pair of mounting assemblies 70, as best seen in FIGS. 3 and 5, are provided on opposed sides of base 21, facing longitudinal sides 28. Mounting assembly 70 includes a body portion 71, which is configured to distribute an applied load to the hull 11 of airship 10. In one or more embodiments, body portion 71 is a fabric material similar to enclosing material 14. To that end, body portion 71 may be wave shaped, with a rear edge 72 and a plurality of scalloped outer edges 73 which may be curved. The body portion 71 is attached to hull 11 along rear edge 72 by any means know in the art, including adhesives, hemming, or incorporating the edge into a seam of hull 11. Furthermore, the curved outer edges 73 intersect at crests 74. A peripheral cable 75 is secured to each curved outer edge 73 by hemming or any other methods of attachment. In other words, a plurality of peripheral cables 75 extend along outer edge 73 and terminate at each crest 74. Positioned proximate to each crest 74 is a bracket 76 which is adapted to receive cable 60 and the peripheral cables 75 which terminate thereat.

Bracket 76 includes opposed, spaced plates 77 which may be triangle shaped and include apertures 78 which reduce the overall weight of bracket 76. Secured between opposed plates 77 and proximate to the corners thereof, are thimbles 79a, b, and c which are disc shaped and include a circumferential groove 80. As is evident from FIG. 5, thimbles 79 may be coupled to plates 77 at a location other than the diametric center of thimbles 79. This orientation allows spaced plates 77 to be smaller, further reducing weight. End 62 of guy cable 60 loops around thimble 79a and is coupled back onto itself as seen in FIG. 5. The loop is secured with a clamp or the like. In this manner, guy cable 60 is received in groove 80 of thimble 79a, thereby securing guy cable 60 to bracket 76. Furthermore, the turn buckle (not shown) provides a means of ratcheting the guy cable 60 tighter until the desired tension is applied. Similarly, thimble 79b and 79c each receive the terminating end of the peripheral cable 75 proximate to bracket 76. The respective peripheral cable 75 is wrapped around thimbles 79b and 79c and secured with a clamp or the like, thereby securing the peripheral cables 75 to each bracket 76. It should be appreciated that while the present embodiment provides thimbles 79 to couple cables 60 and 75 to bracket 76, any coupler may be used which can secure a high tension cable. In this manner, loads from the plurality of guy cables 60 are transferred to peripheral cables 75. Peripheral cables 75 thereafter uniformly transfer the load to body portion 71, which in turn distributes the load to the hull 11 along rear edge 72. In other words, tension applied to guy cables 60 are distributed to hull along the rear edge 72, providing minimized point stresses on the enclosing material 14.

Mounting assembly may further require a pair of load patches 81 positioned on opposed ends of each body portion 71. As shown in FIG. 3, the load patch 81 includes a body 82 which is triangularly-shaped with a rear edge 83, a first angled edge 84 and second angled edge 85. The load patch body 82 is attached to the hull along its rear edge 83. Furthermore, the first angled edge 84 and second angled edge 85 intersect at an apex 86. The peripheral cables 75 which terminate on the opposed ends of body portion 71 are secured to the load patch 81 at the apex 86. In this manner, the applied load from cables 60 are also transferred to the enclosing material 14 and distributed to the hull 11 along rear edge 72 of body portion 71 and the rear edge 82 of load patch 80.

In order to properly mount propulsion assembly 20 to a vehicle 10, the interior of the vehicle must be filled with a gas so that pressure is exerted on the enclosing material 14. The base 21 is then positioned proximate to the enclosing material 14 and guy cables 60 are attached to couplers 45 and brackets 76. Tension is then applied to guy cables 60. As earlier mentioned, this may be accomplished by turn buckles, ratchet assemblies or the like. As tension is applied to the guy cables 60, a compressive force results in the portion of shaft 41 between exposed portion 44 and the bottom ring 30. The compressive loads exerted on shaft 41 are thereafter transferred to the bottom surface 25 where it is distributed to enclosing material 14. Once guy cables 60 are tensioned, deformation of enclosing material 14 occurs at the location where bottom surface 25 contacts enclosing material 14. In other words, once tensioned, the base 21 is forced into the hull such that a depression is formed thereat. In this manner, propulsion assembly 20 is secured to the flexible enclosing material 14 at any desired location on hull 11.

The propulsion assembly of the present invention is superior to prior art mounting devices, as such prior art devices require a rigid structure for a mounting surface. The present invention effectively attaches to fabric skin exterior of high altitude airships without the need for such rigid attachment structures. Further, the assembly of the present invention not only provides a means for attachment to airships without a gondola, but allows for non-traditional attachment sites in airships which include a gondola.

Thus, it should be evident that the propulsion assembly disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. An assembly for attachment to the enclosing material of a non-rigid airship vehicle comprising:
   a base positioned proximate to the enclosing material;
   an extension member projecting radially from both said base and the enclosing material, said extension member including a shaft having opposed ends, said shaft providing an exposed portion between said opposed ends;
   a plurality of couplers disposed on said exposed portion;
   a pair of mounting assemblies attached to the enclosing material, each said mounting assembly extending tangentially from said enclosing material, wherein each said mounting assembly includes a body portion having a rear edge that is fixed to said enclosing material and a curved edge opposite said rear edge; and
   a plurality of guy cables each having a first and second end, wherein said first end of said guy cables couples to said mounting assembly and said second end of said guy cables couples to said plurality of couplers, whereby said guy cables are under tension and a portion of said extension member is under compression.

2. The assembly according to claim 1, wherein said base further comprises an bottom surface which contacts a portion of the enclosing material and includes a rectangular portion having a longitudinal side and a lateral side, and semi-circular end portions, wherein said longitudinal side is respectively longer than said lateral side and said semi-circular portions are proximate to said lateral sides.

3. The assembly according to claim 1 wherein said curved edge comprises a plurality of outer curved edges.

4. The assembly according to claim 3 wherein said mounting assembly further includes a plurality of peripheral cables fixedly attached to said outer curved edges.

5. The assembly according to claim 4, wherein said mounting assembly further comprises a pair of load patches disposed on opposed ends of said body portion, each of which having a body which is attached to said enclosing material, and wherein said load patches each couple to at least one of said peripheral cables.

6. The assembly according to claim 4, wherein said mounting assembly further includes a plurality of brackets, said guy cables and said peripheral cables being fixedly attached to said brackets.

7. The assembly according to claim 1, wherein said extension member comprises said shaft, having opposed ends, an inner wing portion disposed on said shaft and in the form of an airfoil, an outer wing portion disposed on said shaft and in the form of an airfoil, wherein said inner wing portion and said outer wing portions are spaced, defining said exposed portion of said shaft.

8. The assembly according to claim 1, further comprising a motor assembly attached to the end of said extension member and a propeller, said motor assembly adapted to rotate said propeller.

9. The assembly according to claim 1, further comprising:
a motor assembly rotatably mounted to said extension member at said end opposite said base, said motor assembly rotates a propeller and wherein said motor assembly is rotatable about said extension member.

10. A propulsion assembly for attachment to a flexible membrane of an airship comprising:
a base, positioned proximate to the membrane;
an extension member having opposed ends, projecting from said base;
a motor assembly attached to the end of said extension member opposed to said base;
a pair of mounting assemblies separate from said base, attached to the flexible membrane and positioned on opposed sides of said base, said mounting assemblies including a body having a rear edge coupled to said flexible membrane, said body comprising a flat, flexible material;
at least two guy cables, each having a first and a second end;
wherein said first end of each said guy cable is coupled to one of said mounting assemblies and said second end of each said guy cable is coupled to said extension member.

11. The propulsion assembly according to claim 10, wherein said flexible membrane includes a seam, said rear edge is incorporated into said seam.

12. The propulsion assembly according to claim 10, wherein said mounting assembly includes at least two peripheral cables and said body of said mounting assembly includes an outer edge, wherein said peripheral cable is hemmed into said outer edge.

13. The propulsion assembly according to claim 12 wherein said mounting assembly further includes a bracket, said bracket couples to said guy cable and said peripheral cable.

14. The propulsion assembly according to claim 10 wherein said extension member includes a shaft, an inner wing portion enclosing a portion of said shaft, an outer wing portion enclosing a portion of said shaft, wherein said inner and said outer wing portions are spaced, defining an exposed portion of said shaft.

15. The propulsion assembly according to claim 14 wherein said second ends of said guy cables coupled to said exposed portion and diametrically opposed.

16. The propulsion assembly according to claim 14 wherein said inner and said outer wing portions are airfoil shaped.

17. The propulsion assembly according to claim 10 wherein said base includes a bottom surface comprising a rectangular portion and a pair of semi-circular portions disposed on opposed ends of said rectangular portion.

18. The propulsion assembly according to claim 10, wherein said motor assembly is rotatable about said extension member.

19. An airship with a gas filled flexible outer membrane comprising:
a flexible outer membrane;
at least one motor coupled to a propeller;
an extension member projecting away from said membrane;
said extension member having a first end positioned proximate to said membrane and a second end attached to said motor; and
at least two mounting assemblies attached to said outer membrane and spaced from said extension member, wherein each said mounting assembly includes a body having a rear edge coupled to said outer membrane, said body comprising a flexible material, and wherein at least a portion of said extension member is compressed into said membrane by said mounting assemblies.

20. An airship comprising:
a flexible outer membrane filled with a gas and pressurized;
a propulsion assembly having a base at one end and a motor assembly at an opposite end, said motor assembly rotating a propeller; and
a plurality of guy cables each having a first end secured to said flexible outer membrane, and a second end secured to said propulsion assembly, wherein pressure forces generated by said flexible outer membrane and tension forces generated by said guy cables attach said base directly to said flexible outer membrane, wherein said propulsion assembly includes an extension member having a shaft upon which said motor assembly is mounted, and wherein said motor assembly is rotatable about an axis of said shaft, and said guy cables are secured at a position on said extension members so as not to interfere with propeller rotation.

* * * * *